July 27, 1926.
W. E. WHITE
FORM CLAMP
Filed April 5, 1926
1,593,610
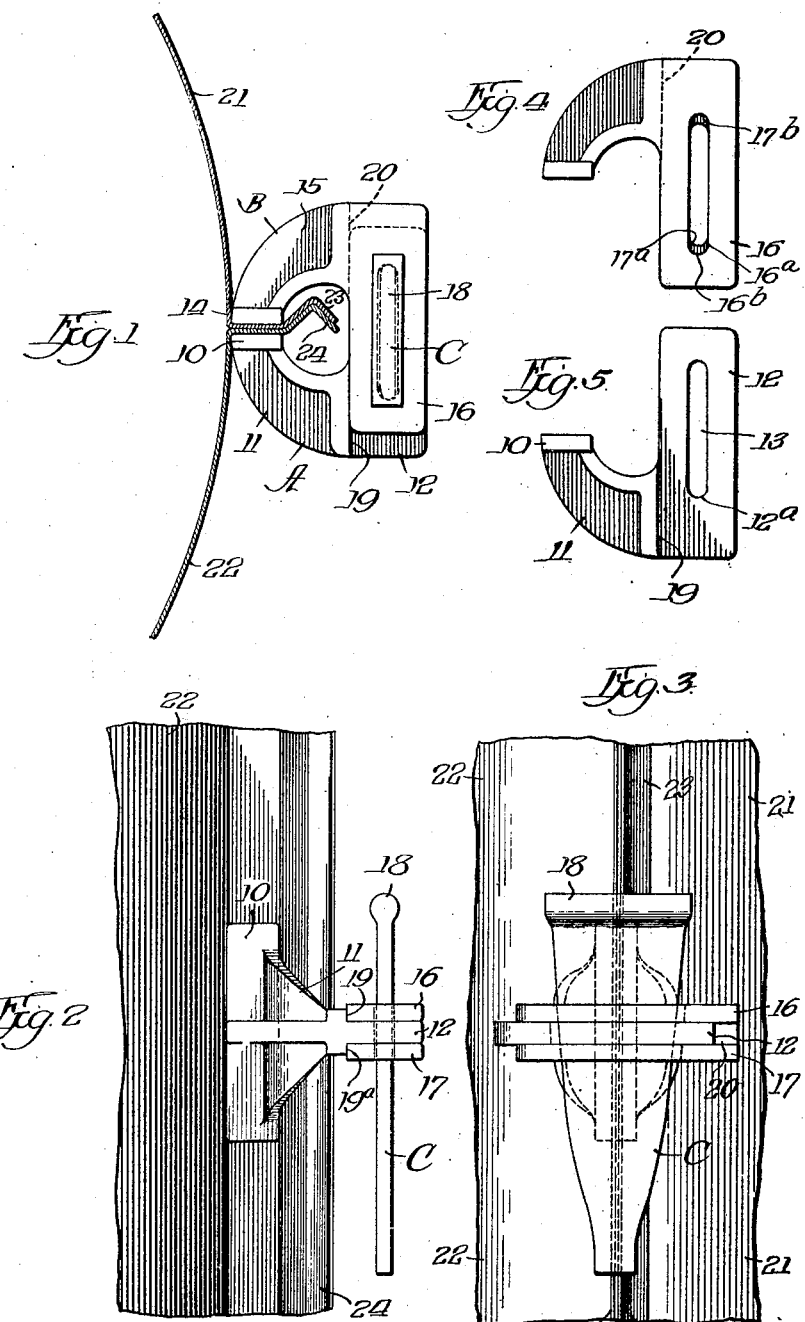
Witness:
Inventor
William E. White
By Chas. P. Murray
Atty.

Patented July 27, 1926.

1,593,610

UNITED STATES PATENT OFFICE.

WILLIAM E. WHITE, OF CHICAGO, ILLINOIS, ASSIGNOR TO KALMAN STEEL COMPANY, OF CHICAGO, ILLINOIS, A CORPORATION OF DELAWARE.

FORM CLAMP.

Application filed April 5, 1926. Serial No. 99,912.

My invention relates to clamps and the like and particularly to clamps for use in connection with column form molds.

It is well known that many forms and kinds of clamps have been devised and used for clamping together the metal parts constituting a column form mold, but the device of my invention has many advantageous features over those now and formerly in use, one of such advantages being its simplicity and its adaptability for operation without special tools.

In the design herein disclosed, I have utilized to advantage the well recognized effectiveness of a wedge acting under a concussive force. A powerful clamping action with a minimum of effort can be secured by utilizing the combination of these two primary forces. Furthermore, the clamping action secured by the movement of the wedge is almost instantaneous following the insertion of the wedge and the first blow applied thereto; thus the device may be operated more quickly than those devices utilizing screw or lever means.

Another and further advantage in the device of my invention is that the clamp is simple, easily operated and positive in its clamping action.

The device of my invention will be more readily understood by reference to the accompanying drawing, in which:—

Fig. 1 is a plan view of a clamp constructed in accordance with my invention;

Fig. 2 is a side elevation of the same;

Fig. 3 is a front view thereof;

Fig. 4 is a top view of one of the two clamping members, and

Fig. 5 is a top view of the complementary clamping member.

The device described herein is composed of three parts, the clamp member, A, the complementary clamp member, B, and a flat wedge or pin, C, preferably made of malleable iron or other metal.

The clamp member A, is composed of a jaw, 10, a supporting member, 11 and a flat slide, 12, provided with an elongated slot, 13, therein. The complementary clamp member B, is provided with a jaw, 14, a supporting member, 15, and a bifurcated slide having two elements, 16, 17, each slide element being provided with registering elongated slots, 16$^a$, 17$^a$, the latter slot being shorter than the former. The slides extend at right angles to the planes of the faces of the jaws of the respective clamp members, the bifurcation in the member B being of such width as to permit the insertion of the slide member 12 of the complementary member A.

The pin C is a flat metal object, being wider at the top than at the bottom, that is, in a wedge shape, and being provided with an enlarged head, 18 at the larger end.

The clamp member A is provided at the inside of the slide member 12 with abutments or flanged guideways, 19, 19$^a$, and the complementary member B is provided with an abutment 20 between the two overlying slide members, 16, 17. These abutments are provided to insure a guideway of uniform direction for the slides when inserted one inside the other, and so that the faces of the jaws, 10, 14 will remain in a substantially parallel plane during the clamping action.

The clamp of my invention is used in connection with column form molds. A sectional plan view of a portion of such a mold is indicated in Fig. 1, consisting of two parts, 21, 22, having laterally projecting marginal flanges provided with interfitting ribs, 23, 24. In operation, the two sections are fitted one into the other as indicated in Fig. 1, and the clamp applied to the flat joint or flange, the interlocking ribs being received within the circular opening provided by the semi-circular jaw supports, 11, 15.

In operation, the slide element of the clamp member A, is inserted into the space between the slide elements 16, 17, the abutments, 19, 19$^a$ providing guides for the sides of the members, 16, 17, and the abutment 20 providing a guideway for the slide element, 12. By this operation of inserting the slide element 12 between the elements, 16, 17, the jaws, 10 and 14 will come closer together and assume a clamping position. Due to the function of the abutments, 19, 19$^a$ and 20, the slide elements are caused to slide one into the other in a parallel or right line relation. When the jaws, 10, 14 are substantially in a closed position, the elongated slots, 13, 16$^a$, 17$^a$ are in register. At this point the wedge or pin C is inserted in the registering slot or hole thus provided and forced downwardly by driving the same on the enlarged head, 18. One side of the wedge will contact the ends 16$^b$ and 17$^b$ of the elongated slots, 16$^a$, and 17$^a$, and the other side of the wedge will contact the end 12$^a$ of the elongated slot 13 of the member A. Thus, when the wedge is driven downwardly by blows on the head, 18, the wedge will tend to move the slide elements 16, 17 in one direction, and the middle slide, 12, in an opposite direction, thus tightening the jaws in proportion to the degree of the angle on the side of the wedge. It may readily be seen therefore, that when the wedge is securely driven into the slot provided, it cannot be loosened except by persistent driving on the sides of the head and on the bottom of the wedge, because any tendency of the jaws to loosen would react upon the sides of the pin at the points 12$^a$ and 16$^b$, and these points being in secure contact with the pin would not give way.

It may readily be seen therefore, that I have provided a clamping device which is simple in its operation, requires no tools other than a driving means, is durable, and certainly positive. The clamping force exerted on the jaws, is only dependent upon the force able to be applied to the head of the wedge, and is not limited as in other clamps, to a lever or screw means, whose limitations are well known. Likewise the disassembling of the clamp is also simple and requires but as little time as applying the same to the form. Similarly, the parts of the clamp herein described are interchangeable with other sets and need not be kept together for efficient operation.

Other modifications may suggest themselves to the craftsman and I do not wish to be limited except as indicated in the appended claims.

I claim:—

1. The combination with form sections having projecting and interfitting marginal flanges, of a pair of independent clamp members each having a jaw and a slide provided with an oblong aperture, the slide of one clamp being bifurcated and adapted to receive the slide of the other clamp therebetween with the apertures in said slides in register, and a wedge adapted to enter said apertures and to draw the jaws toward each other.

2. The combination with form sections having projecting and interfitting marginal flanges, of a pair of independent clamp members each having a jaw and a slide provided with an oblong aperture, the slide of one clamp being bifurcated and adapted to receive the slide of the other clamp therebetween, with the apertures in said slides in register, abutments on the respective slides adapted to effect parallel movement of the slides, and a wedge adapted to enter said apertures and to force the slides and attached jaws toward each other in a right line.

3. A wedge clamp comprising in combination a pair of jaws, a slide formed as a part of each jaw and projected at right angles across the planes of the opposed faces of the jaws, one of said slides being constructed to receive and guide the other slide therein, said slides having elongated openings therethrough, and a flat wedge, the respective margins of which are adapted to act on the slides at the ends of the openings, the flat sides of the wedge serving to insure movement of the slides and jaws in a right line.

4. A wedge clamp comprising in combination a pair of jaws, a slide formed as a part of each jaw and projected at right angles across the planes of the opposed faces of the jaws, one of said slides being constructed to receive and guide the other slide therein, said slides having elongated openings therethrough, and a flat wedge the respective side margins of which are adapted to act on the slides at the ends of the openings, and abutments on the respective slides adapted with the flat wedge to insure movement of the slides under the action of the wedge in a right line.

In testimony whereof I have affixed my signature.

WILLIAM E. WHITE